Jan. 14, 1941. L. T. FREDERICK 2,228,921
PROCESS OF MAKING DECORATIVE RESINOUS PLAQUES
Filed May 15, 1937

INVENTOR.
LOUIS T. FREDERICK.
BY Allen & Allen
ATTORNEYS.

Patented Jan. 14, 1941

2,228,921

UNITED STATES PATENT OFFICE 2,228,921

PROCESS OF MAKING DECORATIVE RESINOUS PLAQUES

Louis T. Frederick, Oak Park, Ill., assignor to The Richardson Company, Lockland, Ohio, a corporation of Ohio Application May 15, 1937, Serial No. 142,933

1 Claim. (Cl. 41—21)

My invention relates to the manufacture of decorative plaques or signs having translucent bodies made by saturating paper, cloth or other laminae with clear synthetic resins. Designs or lettering are formed upon these plaques by contrast of color, opacity or both. There are a number of clear or translucent synthetic resins including, but without limitation, clear phenol formaldehyde resins, resins of the urea aldehyde type and resins of the vinyl type. The general procedure in making laminated resinous bodies, as will be understood by anyone skilled in the art, comprises the saturation of plies with resinous varnishes, drying, assembling the laminae and curing under heat and pressure. By resinous varnish is meant a synthetic resin in an incompletely polymerized condition and dissolved in a suitable solvent. Various solvents may be employed, more common ones being alcohol or water, or combinations of the two.

While my invention relates to translucent signs or plaques which, so far as I know, constitute a new field, yet certain of the problems here involved and particular solutions for them have application likewise to the manufacture of plaques or signs which are not translucent but are designed to be viewed by reflected light. In the claims which follow these specifications I do not therefore desire to be limited to the manufacture of translucent plaques, excepting where specifically indicated in the claims.

A fundamental object of my invention, as will more clearly hereinafter appear, is the manufacture of decorative plaques in which the color or opacity contrast or the decorative or informative indicia thereon are sharp and clear cut and of full body and color. Another object of my invention is the provision of a new process whereby this may be accomplished. Still another object of my invention is the formation of sharp, clear-cut indicia at or near the surface of the article.

In the manufacture either of translucent or of opaque decorative resinous plaques, where printed or decorated laminae have been employed, difficulty has been had with running or smudging of the colors, arising primarily from the fact that the color body is subjected to the solvents of the varnish or to the process of saturation itself, whereby the color tends to become smudged, to run, to lose intensity or to have its uniformity impaired. The elimination of these difficulties constitutes still another object of my invention.

These objects and others which will be set forth hereinafter, or will be apparent to one skilled in the art upon reading these specifications, I accomplish by that certain construction and arrangement of parts, and in that certain process of which I shall now describe an exemplary embodiment. Reference may, therefore, be made to the drawing wherein.

Figure 1:
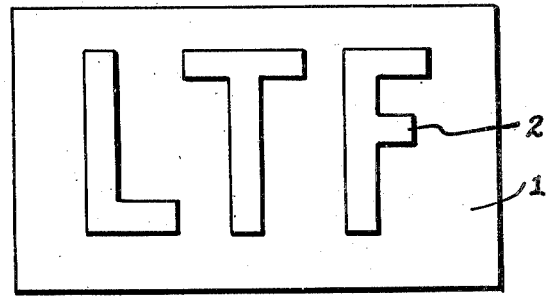
Figure 1 is a plan view of a treated pan.

For the manufacture of translucent plaques I prefer to employ as laminae either cloth or a rag stock paper which has been formed up with an open and therefore easily saturable construction. Such plies when saturated in a clear varnish produce clear laminae. For color it is possible to manufacture the paper, for example, by including a suitable dye or pigment in the pulp, thus producing a pre-colored lamina prior to saturation. Likewise, for opacity, a suitable opaquing substance, such as titanium oxide, may be employed. Color may also be introduced by printing or by the saturation of a ply in a varnish which contains a dye or a pigment or an opaquing substance, or combinations of any of them. Colored or opaque layers are useful in some forms of my structure, and design elements can be created by varying the opacity and/or color of a single lamina, by taking a solidly colored or opaque lamina and cutting a design out of it, or by treating the panel in such a way after formation, as to remove the color or opaque layer in part only, as by sand blasting. It will be apparent that the teachings of the present invention may be used, if desired, in connection with the teachings of my copending applications entitled Decorative signs, Serial No. 142,649 filed May 14, 1937, and Translucent plaques and the like, Serial No. 142,932 filed May 15, 1937.

The present invention relates to a method and the article which is the result of that method wherein color or opacity, or both, are introduced into the article at or near the surface thereof during the process of manufacture. As is well known in the manufacture of laminated resinous materials, the various laminae in saturated and dried form are assembled between what are called pans, but which in effect are highly polished sheets of metal against which the resinous sheets are pressed and cured, and which impart a polish initially to the surface of the pressed and cured articles. In the practice of my invention I apply color and/or opaquing materials as may be desired to one or more or both of the pans which are employed in manufacturing the article. I am not limited as to the color or other materials which may be employed. Finely ground dry pigments or finely ground materials carrying dyes may be employed in wide variety. Inks or the like containing large quantities of grease are for the most part to be avoided; but dry colors, mineral materials containing colors or dyes, mixtures of coloring materials or dyes and opaquing substances, such for example as titanium oxide and the like, may be employed. For many such materials moistening with water or other suitable liquid will form a substance which will hold its shape and position upon the pans after drying. The color or opaque material may be put on the pan by painting with a brush or lining with a pen or both, or may be applied with the aid of a stencil, as by brushing or spraying. It will be possible in certain instances to apply the colors first to a supporting medium and then transfer the colors therefrom to the pans. Where the coloring or opaque material does not have the property of holding its shape when merely moistened, a slight amount of binder, such for example as gum arabic, starch, glue or the like may be employed. The object is to deposit color or opaquing materials, or both, upon the pans in predetermined arrangement and in deposits which are themselves saturable, in this aspect of my invention. In another aspect of my invention it will be found possible to mix with dry coloring or opaquing materials a certain quantity of incompletely polymerized but solid and finely divided synthetic resinous materials, generally, though not necessarily, of the type employed in the laminae of the article to be produced. Likewise, under certain circumstances, it is possible to mix the coloring material with a resinous varnish and paint or spray, or otherwise deposit this upon the pans, and dry off the varnish solvent.

Figure 2:
Fig. 2 is an exaggerated sectional view thereof.

In any of these ways a suitable color deposit is produced upon at least one of the pans employed in manufacturing the article. I have illustrated this in Figs. 1 and 2, where I represents the pan and 2 represents suitable indicia or decorative elements of color or opaquing material, or both, imposed upon the pan.

In the manufacture of my article, a body 3 consisting of a suitable number of laminae which have been saturated in varnish and dried, are assembled upon the pan to form a body. The body may contain a colored layer 4 at or near its surface. After the assembling of the laminae upon the pre-treated pan, the article is pressed and cured in the ordinary way.

Figure 3:
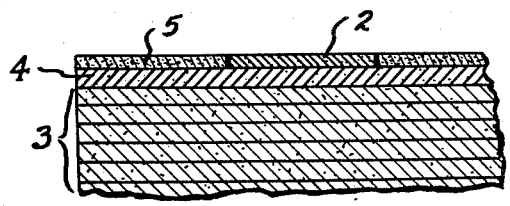
Fig. 3 is an exaggerated and semi-diagrammatic view of a plaque made in accordance with my invention.

As is well known in the manufacture of resinous articles, the heat employed in the press serves to soften or liquefy the incompletely polymerized resin. Where the color deposit 2 is of porous character, the fused resin thoroughly saturates it during the pressing operation, giving a result such as that illustrated in Fig. 3, where the top surface of the article is a very thin layer of resin 5 in which the color deposit 2 is imbedded. I have found that in this way plaques may be made which have quite smooth and highly polished surfaces. A similar effect may be obtained when products already containing resin are employed, as will be clear.

It will be understood, of course, that the color deposits upon the pan are dried prior to the building upon the pan of the separate laminae or the preformed body of laminae. As a consequence the coloring or opaquing material is not subjected in the manufacture of the article to any solvent or washing action which would tend to smudge the colors to cause them to run, to displace them or to impair their intensity. The article specifically illustrated in Fig. 3 comprises a translucent body 3, a colored layer near the surface 4 and indicia or design elements 6 which contrast with the colored area 4 either in color or in opacity, or both, as the case may be. Wide modifications may be made in such a structure without departing from the spirit of my invention. If the colored layer 4 is omitted, the design indicia 2 will stand out in color or in opacity, or both, against the background. Where colored layers 4 are used they may be cut over the area of the color deposits on the pans or elsewhere so as to give to the article background and design elements of contrasting colors. Where the colored layer 4 is continuous, color deposits 2 may be employed which in combination with the color of the layer 4 over selected areas form new colors.

Having thus described my invention, what I claim as new and desire to secure by Letters Patent is:

A process of making decorative resinous panels which comprises providing a pressing pan, imposing on said pressing pan a contrast material in deposits at selected areas, said deposits being of a saturable construction, applying to said pan at least one dried and saturated lamina, pressing and curing the lamina against the pan, and saturating said contrast material with the resin derived from said lamina and incorporating it into the surface of the article so produced.

LOUIS T. FREDERICK.